G. R. Moore,
Drag Saw.
N° 18,943.  Patented Dec. 22, 1857.
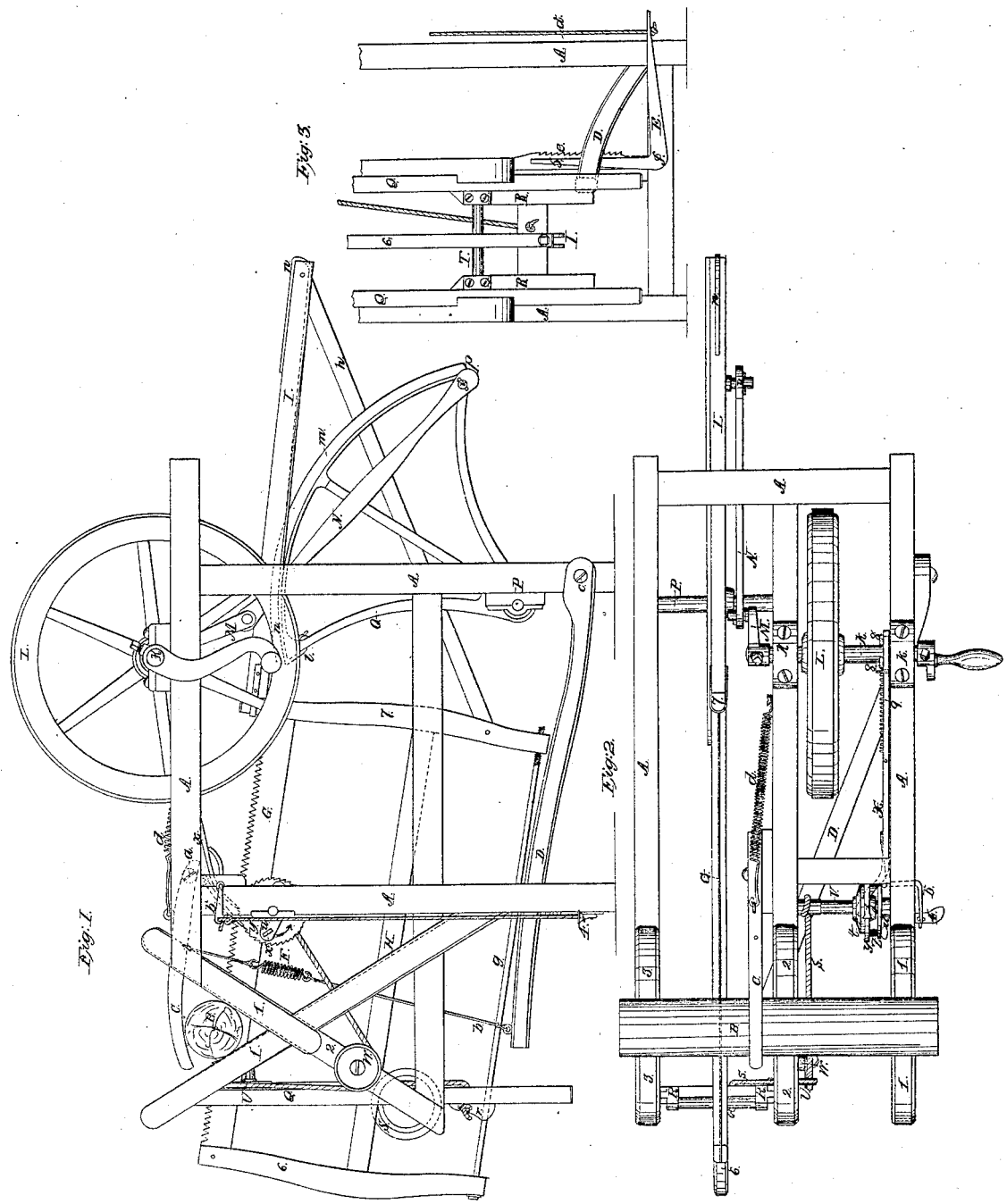

UNITED STATES PATENT OFFICE.

GEO. R. MOORE, OF WESTFORD, MASSACHUSETTS, ASSIGNOR TO HIMSELF AND CHAS. G. SARGENT, OF SAME PLACE.

CROSSCUT-SAWING MACHINE.

Specification of Letters Patent No. 18,943, dated December 22, 1857.

*To all whom it may concern:*

Be it known that I, GEORGE R. MOORE, of Westford, in the county of Middlesex and State of Massachusetts, have invented certain new and useful Improvements in Machines for Sawing Wood, of which the following is a full, clear, and exact description, reference being had to the accompanying drawings, making part of this specification, in which—

Figure 1, is a side elevation; Fig. 2 a plan; Fig. 3 a partial front end view.

A is the frame of the machine properly braced and steadied, to the front end of which is attached the horse for supporting the stick to be cut. This horse is composed of three sections 1 2 3, the upper portions of which are V shaped to receive the stick of wood B, which is held down firmly upon them by a clamp C. This clamp is furnished with sharp teeth on that part of its under surface which comes in contact with the stick B. It is pivoted at $a$ to the frame of the machine, and is drawn down onto the stick by a rod $b$, attached to a foot level D, pivoted at $c$ to the frame A. The clamp is drawn up when relieved from the traction of $b$ by a spring $d$, attached to it and to the frame. The lever D, is retained when pressed down, by a toothed rack, $e$, Fig. 3, attached to one of the posts of the frame (a small plate being secured on the top of the lever to catch in the notches of the rack) and is tripped or freed from the rack $e$, by a bent lever E, pivoted at $f$ to one of the cross braces of the frame, so that by pressing with the foot on the outer end 4 of this lever the other or vertical end 5 is forced against the lever D, and frees it from the rack $e$. The middle section No. 2 of the horse (as shown partially dotted in Fig. 1) is a little lower than the two adjoining sections, at the angle of intersection of its two pieces, or at that part immediately beneath the stick B, so that the stick rests on the sections 1 and 3 until the saw has cut nearly through the stick, when the pressure of the clamp C, upon the stick brings it down onto the section 2. This causes the saw kerf to gape on the lower side of the stick and relieve the saw from binding in the wood as it is apt to do near the last of the cut. This pressure is given to the clamp C, by a spiral spring F attached to the rod $b$, which spring is distended when the lever D, is pressed down and held beneath a notch of the rack $e$. It is sufficiently strong to communicate the requisite pressure to the clamp to hold the stick B firmly down on the horse; when however the stick is nearly cut through by the saw, the pressure of the clamp (caused by the retraction of the spring F) forces the stick down onto the middle section 2 of the horse (which as before stated is lower than the adjoining ones) and by bending down the middle of the stick causes the saw kerf to gape and thus relieves the saw at the last of its cut where it is most apt to bind.

The saw in this machine is arranged to cut up from below, by which the saw kerf is constantly freed from the saw dust and the saw is prevented from choking. At the same time it is out of the way of the operator when handling the stick of wood. The manner in which the saw is vibrated and fed up to the stick, and the arrangement for accommodating the feed to the work required of the saw, will now be explained.

The saw G is distended in a frame somewhat similar to the ordinary wood saw. It consists of two end pieces 6 and 7, a reach H, and a straining rod $g$. To the upper end of the piece 7 is firmly attached a stout piece I, which extends back toward the rear of the machine, and is stiffened by an angle brace $h$ which extends from the outer end of the piece I, back to the lower part of the piece 7. Power is applied to a shaft K, supported in suitable bearings $k$ on the frame A. This shaft carries a fly wheel L, between its bearings and at its inner end a crank M, to which is attached a connecting rod N, the other end of which is pivoted at $i$ to one side of a frame or segment O. This segment vibrates on a short shaft P, having bearings in the frame A. It is furnished on its periphery with a fin $m$, which enters a groove in the under side of the piece I, as shown dotted in Fig. 1. This leaves a narrow ledge on each side of the fin on which rest two straps which connect the piece I to the segment O. One of these straps $n$, is attached to the segment O, at $l$, It is thence led over this segment along side of the pin $m$, to the outer end of the piece I, where it is secured. Another strap is attached in a similar manner to the other side of the segment O at $p$ and to the inner end of the piece I. This arrangement while it communicates to the saw the required reciprocating motion, gives the thrust in a direct line with the face of the saw, although the angle of inclination of the saw is constantly changing as it is fed up to its work.

Secured to the outer side of sections 2 and 3 of the horse are two vertical pieces Q which serve as ways between which slides a gate R, which supports the front end of the saw; a small wheel S, is carried on axle T, having its bearings in the two side pieces of the gate R. A fin on the periphery of this wheel enters a groove in the under side of the reach H of the saw frame. The straining rod $g$, plays through a block $r$, on the lower side of the gate. The manner in which the saw frame is supported keeps it always in a vertical plane.

The manner in which the gate R is raised and the saw is fed up to its work is as follows: A cord S attached to the gate R is carried over a pulley U, and around another pulley W, to a shaft V, on which it is wound up. This shaft V is revolved in the following manner: A disk $t$, and a clamp $u$ are secured to the shaft, a ratchet wheel $y$, runs loosely on the shaft except when it is clamped to the disk $t$, by the set screws $x$, which pass through the clamp $u$ and press the ratchet wheel against the disk with sufficient force to give it friction enough to carry the disk and shaft around with it as the wheel is fed forward in the direction of its arrow. The ratchet wheel $y$, is revolved by a dog X one end of which engages with the teeth of the wheel, while the other end which is forked embraces the driving shaft K. It is moved back and forth by pins 8 on the shaft and by a coiled spring 9, one end of which is attached to the dog and the other to the frame A. A retaining pawl $z$ is pivoted to the frame and engages with the teeth of the wheel $y$. A cord $a^2$ is attached to the pedal 4 of the foot lever E, and to a trip lever $b^2$ which pivots in the frame A. The bent end of this lever passes beneath the dog X and pawl $z$ so that by pressing down on the front lever E the dog and pawl are raised and the shaft V, is free to revolve in a counter direction when the cord $s$ is unwound by the descent of the gate R caused by the weight of the saw frame.

By the use of the above described friction clutch, the power applied to driving the saw may continue uniform, while the feed will accommodate itself to the resistance offered by the stick being cut. For example if when cutting through a stick of soft wood the saw comes in contact with a knot or a harder portion of the wood, the saw will not penetrate to so great a depth at each cut, and will consequently bring a greater strain on the cord $s$, as this exceeds the definite amount of friction put upon the ratchet wheel $y$ by the screws $x$ and disk $t$, the wheel will slip as it is fed forward and the feed of the saw will be slower. This amount of friction is of course regulated to suit the kind of wood being cut.

Operation: The stick of wood B, is placed on the horse. The foot lever D, is pressed down and caught in one of the notches of the rack $e$. This brings down the clamp C and confines the stick, the spring F being distended that the stick may be drawn down by it at the last of the cut as before explained. Then as the shaft K, is revolved, the saw is vibrated back and forth. At the same time it is fed upward by the revolution of the shaft V, as before explained. When the stick is cut through, the operator presses his foot on the end 4 of the lever E. This frees the lever D from the rack $e$, and allows the clamp C, to be drawn back by its spring $d$, leaving the stick B, free to be shifted or removed by the operator. At the same time the dog X, and pawl $z$ are tripped by the lever $b^2$ and the shaft V, is free to turn and allow the gate R, and the saw frame to descend, when the operation may be repeated.

What I claim as my invention and desire to secure by Letters Patent in a machine for sawing wood is—

1. The peculiar method of hanging the inverted saw within its gate, by means of the guide wheel S, and block $r$, as set forth.

2. I claim depressing the middle section of the horse in the manner and for the purpose described.

3. I claim driving the saw by means of the segment O, and straps $n$, in the manner and for the purpose specified.

4. I claim uniting the ratchet wheel $y$ to its shaft by means of a friction clutch in the manner and for the purpose set forth.

GEO. R. MOORE.

Witnesses:
J. W. ABBOT,
J. W. P. ABBOT.